US012807341B2

(12) United States Patent
Rajendranath

(10) Patent No.: US 12,807,341 B2
(45) Date of Patent: Nov. 24, 2026

(54) REMOTE AUTONOMOUS DRONE SYSTEM

(71) Applicant: Darren Rajendranath, Tallahassee, FL (US)

(72) Inventor: Darren Rajendranath, Tallahassee, FL (US)

( * ) Notice: Subject to any disclaimer, the term of this patent is extended or adjusted under 35 U.S.C. 154(b) by 93 days.

(21) Appl. No.: 18/754,294

(22) Filed: Jun. 26, 2024

(65) Prior Publication Data

US 2026/0054865 A1 Feb. 26, 2026

Related U.S. Application Data

(60) Provisional application No. 63/528,089, filed on Jul. 21, 2023.

(51) Int. Cl.

*B64U 50/37* (2023.01)
*B64U 70/90* (2023.01)
*B64U 101/45* (2023.01)

(52) U.S. Cl.

CPC ............ *B64U 50/37* (2023.01); *B64U 70/90* (2023.01); *B64U 2101/45* (2023.01)

(58) Field of Classification Search

CPC ..... B64U 50/37; B64U 70/90; B64U 2101/45
See application file for complete search history.

(56) References Cited

U.S. PATENT DOCUMENTS

| | | | | |
|---|---|---|---|---|
| 2017/0050749 | A1* | 2/2017 | Pilskalns | B60L 53/37 |
| 2019/0308724 | A1* | 10/2019 | Cooper | B64U 80/25 |
| 2020/0165008 | A1* | 5/2020 | Krauss | G05D 1/0676 |
| 2021/0229805 | A1* | 7/2021 | Getman | B64C 27/52 |
| 2022/0247347 | A1* | 8/2022 | Gavrilov | B08B 13/00 |
| 2024/0278946 | A1* | 8/2024 | Roberts | B64U 70/92 |
| 2024/0365728 | A1* | 11/2024 | Miller | A01M 29/10 |

FOREIGN PATENT DOCUMENTS

| | | | | |
|---|---|---|---|---|
| WO | WO-2014160589 A1 * | 10/2014 | | A01C 21/00 |
| WO | WO-2023056516 A1 * | 4/2023 | | B64U 70/93 |

* cited by examiner

*Primary Examiner* — Justin M Benedik
(74) *Attorney, Agent, or Firm* — J. Wiley Horton

(57) ABSTRACT

A base station and drone system for aerial data collection. The system can be remotely operated as a stand-alone device in power and cell tower restricted areas. Data can be captured and processed on board in these areas. The system can also be operated using external communications where that capability is available.

20 Claims, 16 Drawing Sheets

REMOTE AUTONOMOUS DRONE SYSTEM

CROSS-REFERENCES TO RELATED APPLICATIONS

This non-provisional patent application claims the benefit of an earlier filed provisional application. The provisional application listed the same inventor. It was filed on Jul. 21, 2023 and was assigned Ser. No. 63/528,089.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of drones. More specifically, the invention comprises a remotely operable drone base station and drone that is suitable for the collection of data and the performance of other operations.

2. Description of the Related Art

Aerial drones are useful for many purposes. They are particularly useful for aerial data collection. The data collection may take the form of aerial images, surface mapping measurements, and the like. Exemplary data collection schemes in the field of agriculture are disclosed in my own U.S. patent application Ser. No. 17/489,971. U.S. patent application Ser. No. 17/489,971 is hereby incorporated by reference.

Many prior art systems use larger drones that are expensive to purchase and operate. The cost of these systems require a single drone to be used for multiple different locations—with the result that data for any given site is collected only sporadically. It is preferable to provide a drone that is dedicated to a single area of operation—so that data can be more frequently collected. The term "area of operation" is not limited to a single field or single center-pivot installation. It may encompass multiple fields or center-pivots, but they are all in close proximity so the drone does not need to fly far from its base.

The present invention provides a drone and base station system whereby a small drone can be remotely housed and operated. Numerous features are disclosed in the following sections.

BRIEF SUMMARY OF THE INVENTION

The present invention comprises a base station and drone system for aerial data collection. The system can be remotely operated as a stand-alone device in power and cell tower restricted areas. Data can be captured and processed on board in these areas. The system can also be operated using external communications where that capability is available.

REFERENCE NUMERALS IN THE DRAWINGS

Figure 1:
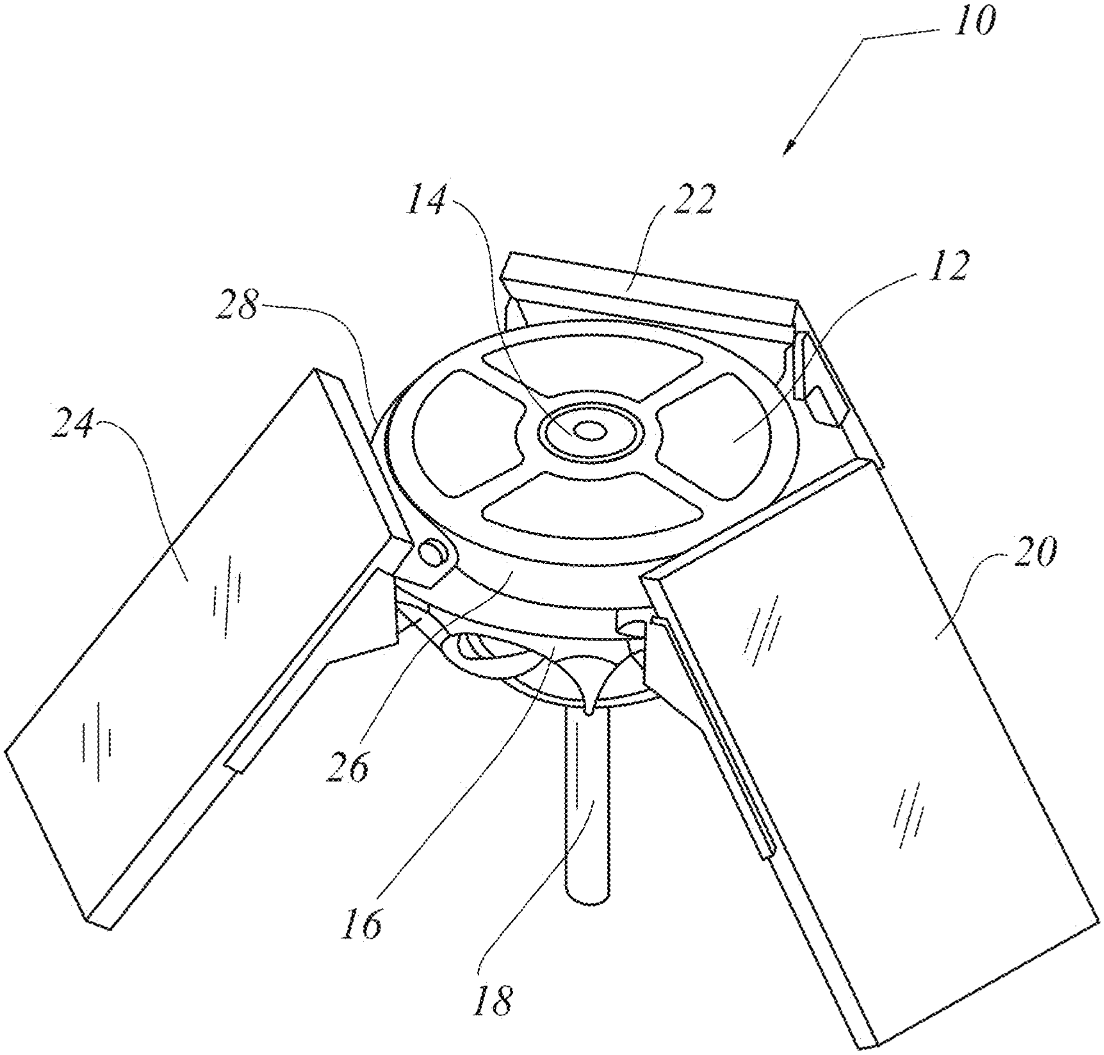
FIG. 1 is a perspective view, showing an example of the inventive drone base station.

10 drone base station
12 landing pad
14 GPS reference station
16 chassis
18 mount
20 solar panel
22 solar panel
24 solar panel
26 electronics housing
28 retractable cover
30 drone
32 leg
34 foot
35 foot
36 tank
38 rotor
40 charge contact
42 charge contact
44 charge contact
46 charge contact
48 non-conductive area
50 center-pivot irrigation system
52 pivot joint
54 elbow
56 horizontal segment
58 boom
60 pivot axis
62 mounting clamp
64 mounting arm
66 toroidal tank

68 filler tank
69 opening
70 lift line
71 pump
72 mount
74 liquid boom
76 dispenser head
78 feed line
80 processor
82 memory
84 R/F module
86 charge controller
88 RTK module
90 transfer pump controller
92 liquid boom controller
94 cover controller
96 solar charge controller
98 battery
100 tripod mount
102 leg
104 pad
106 spike
108 ground
110 inverted conical landing pad
112 charge contact
114 charge contact
116 lower opening
118 drone
120 rotor guard
122 electrical contact
124 electrical contact
126 electrical contact
128 electrical contact
130 tube
132 intake
134 charge contact
136 charge contact
138 transfer pump
140 tank
142 valve
144 water turbine
146 charging line
148 pendant
150 liquid spray drone
152 data survey drone
154 pump house mount
156 generator
158 bracket
160 bracket
162 feed line
164 discharge line
166 outlet

DETAILED DESCRIPTION OF THE INVENTION

The following disclosure describes in detail several particular embodiments of the invention. Many more embodiments will occur to those knowledgeable in the field. The scope of the invention should thus be fixed by the claims presented rather than the specific embodiments described.

FIG. 1 depicts an exemplary drone base station 10 constructed according to the present invention. Mount 18 is an attachment point allowing the base station to be placed in any desired location. The mount can assume a wide variety of forms. Chassis 16 is connected to mount 18. Landing pad 12 and electronics housing 26 are supported by the chassis. Solar panels 20,22,24 are also supported by the chassis.

In the version shown, the solar panels provide electrical power to the drone base station and the drone itself. These panels can be provided with adjustable mounts. However, it is often preferable to provide a fixed configuration that will work in a wide variety of installations. The drone base station is not necessarily placed in a fixed location. It may be placed in a fixed location for an interval (such as a week or two) and then moved to a new location. This allows the drone operations to be moved where needed. In order to provide location flexibility, the embodiment shown uses three solar panels radially spaced in 120-degree increments. They may also be tilted as appropriate for the latitude of the installation. The radial spacing of the panels means that sufficient solar power will be delivered in nearly any orientation of the drone base station. Other embodiments may use two, four, five, or some other number of panels. The fixed nature of the panels means that the user does not need to worry about the orientation of the panels. He or she simply installs the drone base station with landing pad 12 in a horizontal orientation (or reasonably close thereto). The three panels shown on this embodiment will then provide sufficient charging as the sun transits the sky.

Landing pad 12 is large enough to receive a flying drone. GPS reference station 14 is provided proximate the center of the landing pad. In operation, the flying drone will spend most of its time resting on landing pad 12. A weather-resistant cover is desirable for the drone and the landing pad. In this embodiment, retractable cover 28 is provided.

Figure 5:
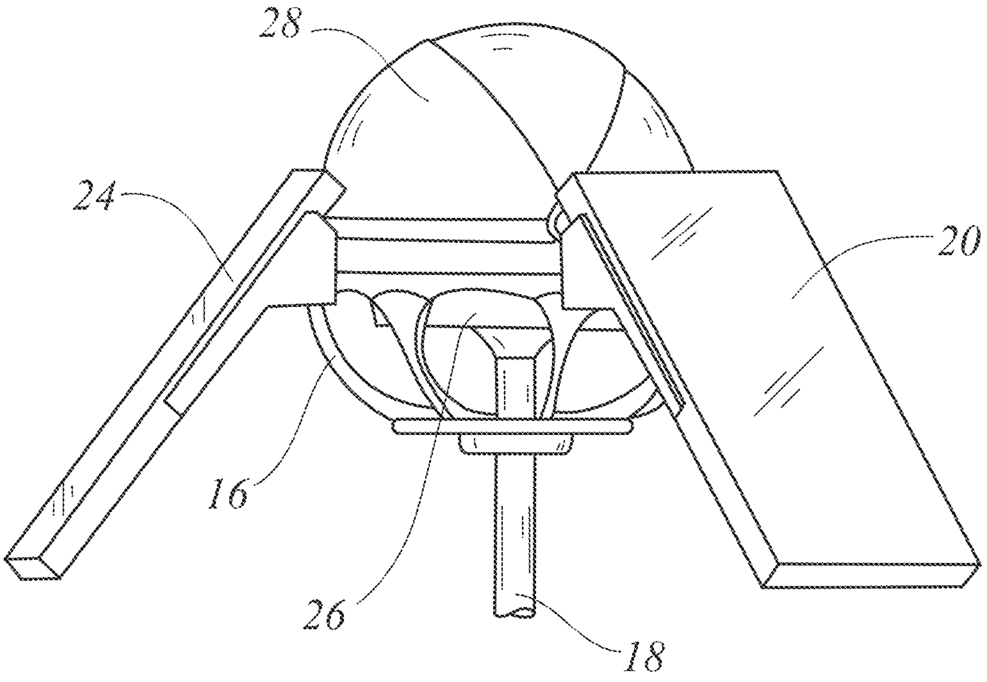
FIG. 5 is an elevation view, showing the drone base station with the retractable cover in a closed position.

FIG. 5 shows an elevation view of the same inventive embodiment, with retractable cover 28 in the closed position. Many types of covers can be used and the invention is not limited to any particular type. In this instance, a three-piece telescoping cover is used. Each piece is hinged to chassis 16. They overlap so that—when deployed—the landing pad area is shielded from rain. An electric motor is preferably used to extend and retract the cover pieces.

Figure 2:
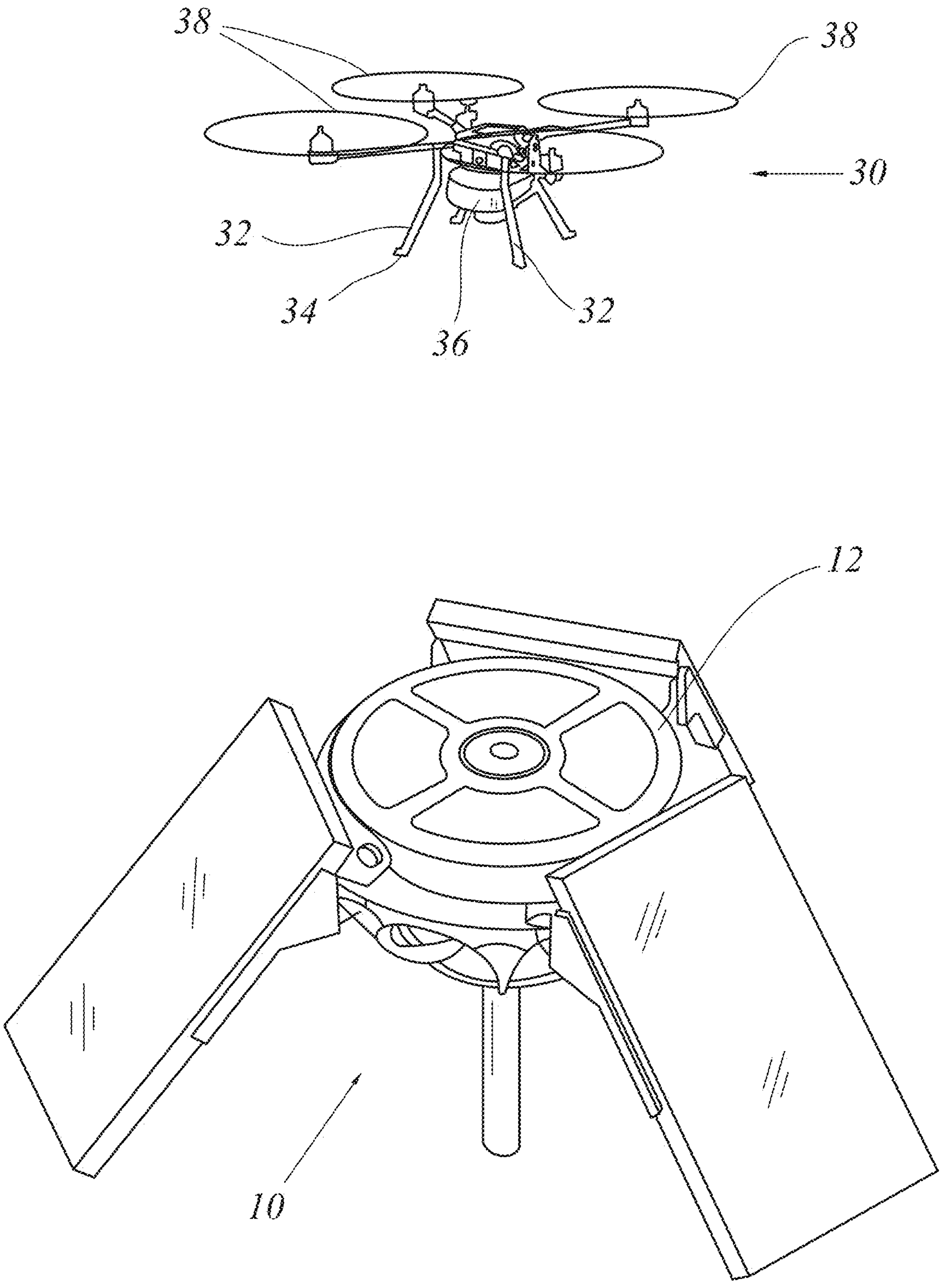
FIG. 2 is a perspective view, showing a drone hovering above the base station of FIG. 1.

FIG. 2 shows drone base station 10 with the retractable cover open. Exemplary drone 30 is shown hovering able landing pad 12. As those skilled in the art will know, there is a wide variety of drones. The particular drone shown includes a tank 34 that is suitable for receiving and transporting liquids—such as pesticides or fertilizers. Four rotors 38 are mounted to laterally extending arms. Four legs 32 descend from the same arms that mount the rotors. A foot 34 is provided on the lowest extent of each leg. The feet 34 contact the landing pad when the drone is recovered. They support the weight of the drone when it is resting on the landing pad.

Returning now to FIG. 1, the operation of GPS reference station 14 will be explained. The GPS reference station includes a GPS receiver which calculates its present position based on receiving signals from the orbiting GPS constellation. It then corrects any errors present in the resulting GPS-based position determination.

While a detailed discussion of GPS-based position calculations and correction methods is beyond the scope of this disclosure (and well known to those skilled in the art), a brief discussion is presented to benefit the reader's understanding. Conventional GPS-based systems receive signals from multiple orbiting GPS satellites and use the time difference in the signal receptions to calculate a position for the GPS receiver. Such systems are quite accurate—at least in comparison to pre-GPS systems. For example, the simple GPS receivers operating in most smartphones provide an accuracy of about 4.9 m (16 feet).

Supplemental systems can be provided to enhance the positional accuracy of a typical GPS receiver. One approach is to provide an array of ground reference stations. Each reference station has a precisely-surveyed position. A GPS receiver is placed on that known location. Position calculations performed by that GPS receiver are then compared to the known location and a positional error is then determined. That positional error can then be provided as an error-correction signal (ultimately a position correction signal) to other GPS receivers in the general area. The other receivers use this error signal to correct the positions they calculate-providing enhanced accuracy. The United States has implemented a network of such ground reference receivers known as the Wide Area Augmentation System ("WAAS"). WAAS-enabled GPS receivers produce an accuracy of 2 to 4 meters in a horizontal position.

Even more accuracy is produced by using a local reference station. A very accurate position can be surveyed for this local reference station and a GPS receiver placed on that local reference station can then provide a very accurate local error-correction signal. Local reference stations are now commonly used in land surveying. These provide a very accurate error-correction signal to a mobile unit nearby. Positional accuracy (in the horizontal plane) for such a system is about 1 cm—even in "real world" conditions. Such systems are often referred to as Real-Time Kinematic positioning systems ("RTK systems').

Looking again at FIG. 1, GPS reference station 14 serves as a local reference station. The position of this station 14 is surveyed so that it is known very accurately. Its preferred position in the center of the landing station provides more accurate geo-reference data than for other landing stations where the GPS is not at the center. It is then able to compare a computed position from its GPS receiver against the known position from the survey, and thereby create an error-correction signal. It provides the error-correction signal (which again is in effect a position correction signal) to the GPS receiver located on the mobile drone 30. This error-correction signal significantly enhances the positional accuracy of the GPS receiver on the drone—while the drone is flying. Looking at FIG. 2, the use of the error-correction signal allows the drone to accurately position itself directly over landing pad 12. The placement of reference station 14 directly in the center of the landing station gives the ability to center the drone for landing more accurately than other stations using a GPS system.

The GPS-derived horizontal position is very accurate in this situation. The GPS-based vertical position is less accurate. However, the drone is equipped with other height-finding sensors that can accurately determine its height above the landing pad. Thus, the error-corrected GPS signal is used by the drone to accurately position itself above the landing pad (preferably with a good vertical margin, such as 1 meter above). The drone's control system then uses its other sensors to slowly lower itself for a soft-contact landing on the pad. For example, the drone can continue to use error-corrected GPS for horizontal positioning and ultrasound or LIDAR to determine its height above the pad.

The drone contains batteries that must be recharged periodically. Recharging is usually performed while the drone is stationary on the landing pad. To facilitate recharging, the inventive drone base station preferably incorporates recharging features in the pad. Inductive charging can be used (transferring power by electromagnetic signals). It is preferable to provide direct-contact charging, however.

Figure 3:
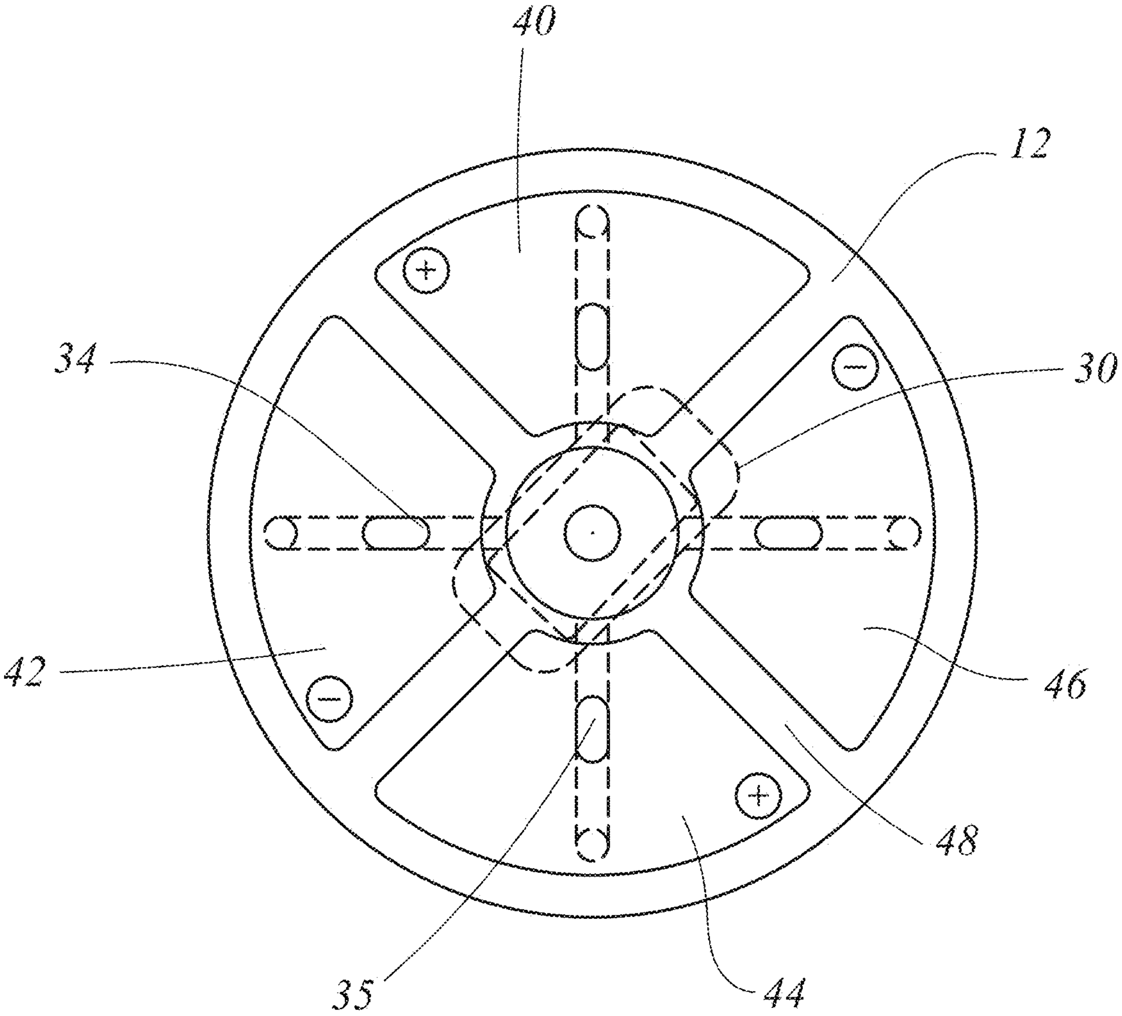
FIG. 3 is a plan view, showing a drone resting on the landing pad.

FIG. 3 provides a plan view of landing pad 12—illustrating the features configured to provide direct-contact charging. The area of the landing pad is divided between the reference GPS receiver (in the middle) and four separate charge contacts 40,42,46,48. The charge contacts can be used in a variety of charging schemes. In the example shown, adjacent pads are electrically isolated and provide two separate conductors in the charging circuit. As an example, if DC charging is used, then one pad will be the positive conductor and the adjacent pad or pads will be the negative conductor.

In the embodiment of FIG. 3, charge contacts 42 and 46 are negative, while charge contacts 40 and 44 are positive. The dashed lines show the outline of the drone 30 as it sits on the pad, with the solid lines showing the contact point for each foot. The reader will note that foot 34 has contacted negative charge contact 42 while foot 35 has contacted positive charge contract 44. Foot 35 can be used as the positive contact for the charging circuit and foot 34 can be used as the negative contact for the same circuit. Thus, with the drone landed in the configuration shown, a positive-contact charging circuit is created. A charging circuit within the electronics housing of the drone base station provides the power to the charge contacts on the landing pad and this in turn charges the drone (through the feet).

Figure 4:
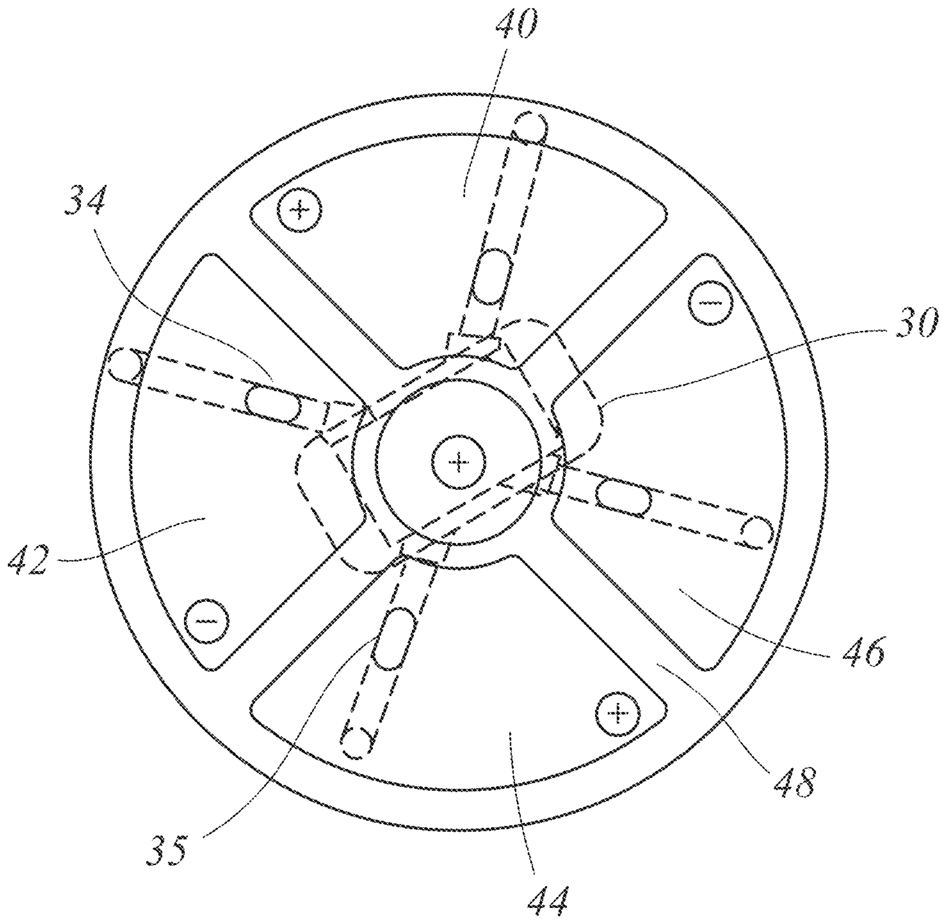
FIG. 4 is a plan view, showing a drone resting on the landing pad.

The large surface area of the non-conductive areas 48 separating the four charging pads helps ensure that a drone foot does not inadvertently "bridge" both legs of the charging circuit. FIG. 3 shows the drone in a first angular orientation. FIG. 4 shows the drone 30 (again shown in dashed lines) rotated and displaced from the ideal position. The reader will note that foot 34 still makes contact with negative charge contact 42 and foot 35 still makes contact with positive charge contact 44. The geometry is thus tolerant of position and orientation errors in the landing of the drone.

Figure 10:
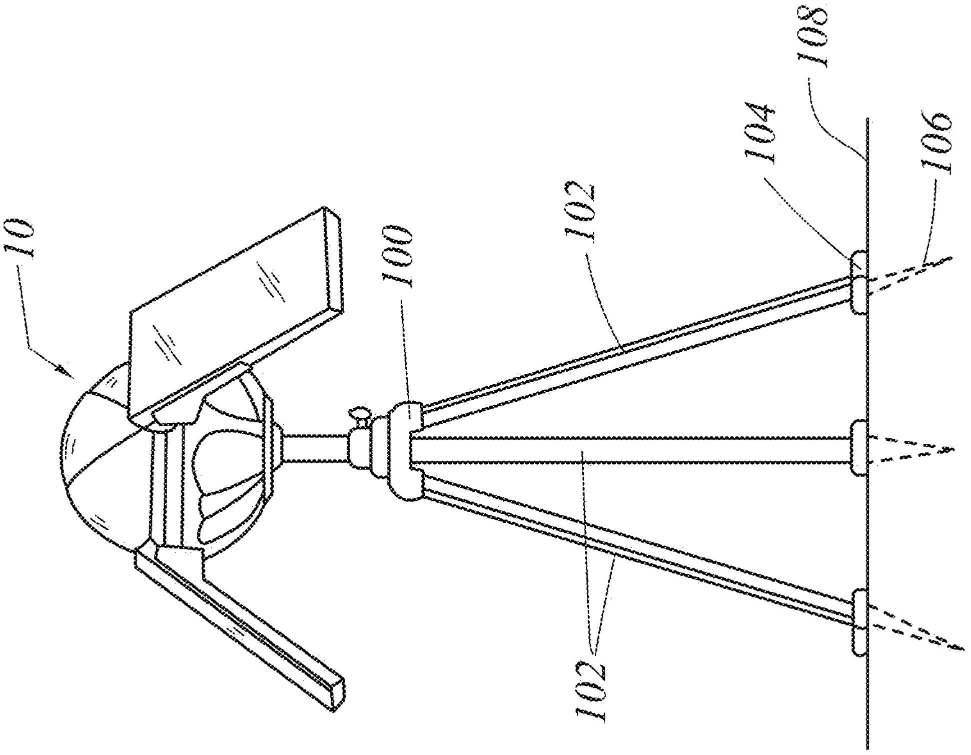
FIG. 10 is an elevation view, showing an alternate mounting arrangement for the inventive drone base station.

FIG. 5 provides an elevation view of the inventive base station with the drone landed on the landing pad and retractable cover 28 in the closed position. Chassis 16 provides support for the cover and landing pad. It also provides support for electronics housing 26. The electronics housing provides suitable control and power components, as will be described in more detail subsequently. The drone base station can be installed in a wide variety of temporary, semi-permanent, and permanent locations. FIG. 10 shows the inventive drone base station 10 mounted to tripod mount 100. The tripod mount includes three legs 102, with pads 104 on the bottom. Spikes 106 are preferably provided on the pads. The user can locate the tripod mount in a suitable location (including a position that has already been surveyed) and press the spikes into the ground to hold it in place. This type of installation will suffice for many operations.

Figure 6:
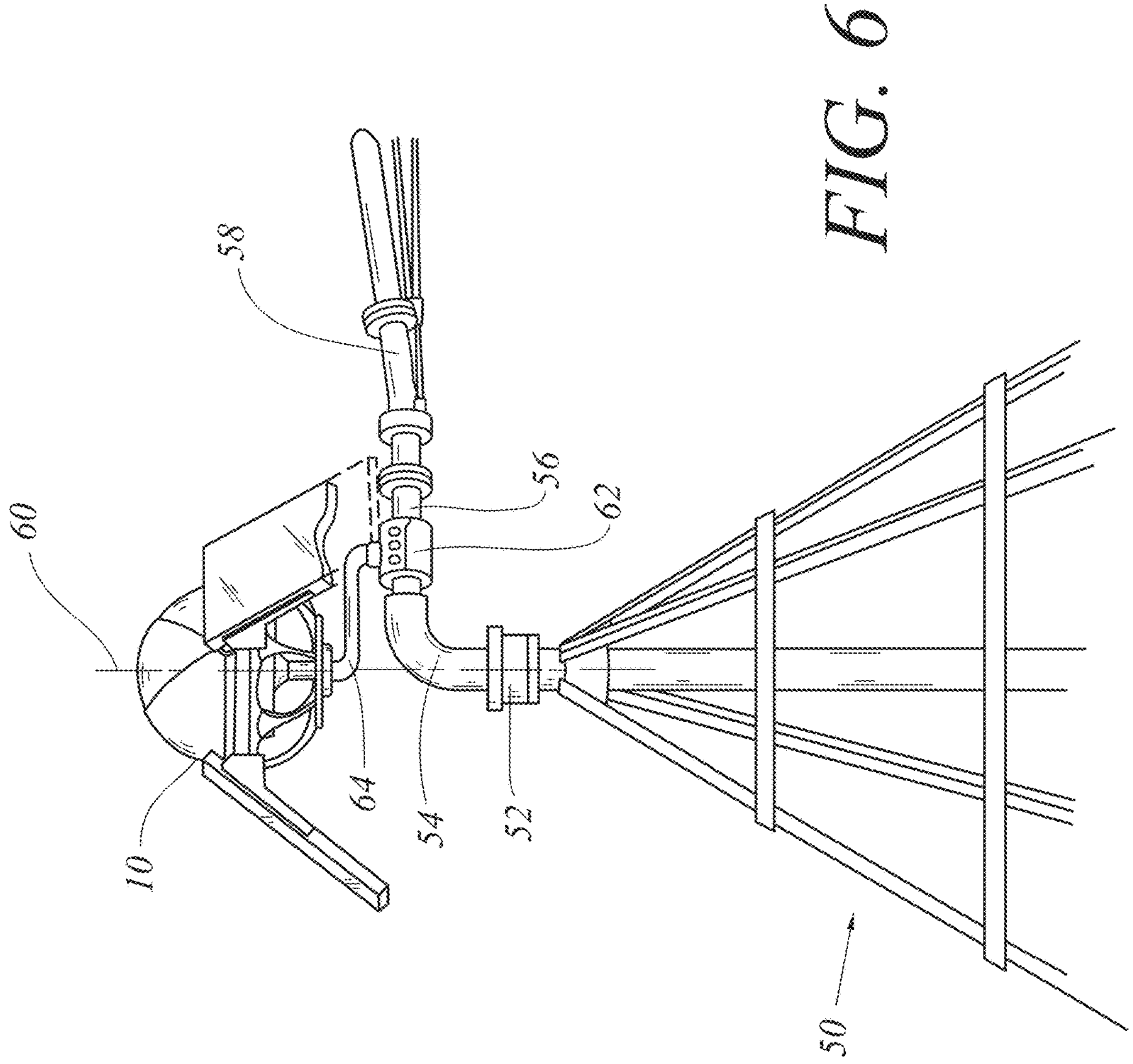
FIG. 6 is an elevation view, showing a drone base station mounted on a center-pivot irrigation system.

FIG. 6 shows another exemplary installation. Center pivot irrigation system 50 is installed in a field. The moving booms may be moved to other fields from time to time but the center pivot itself tends to remain in a single position throughout its service life. Pivot joint 52 lies atop the center pivot. Pumped irrigation water passes through pivot joint 52, elbow 54, and out through a series of booms 58. Pivot axis 60 runs through the middle of pivot joint 52.

Mounting clamp 62 is provided to attach drone base station 10 to a convenient location-such as horizontal segment 56 of the boom assembly. Mounting arm 64 is provided. It serves to locate the center of drone base station 10 as close as possible to pivot axis 60 (and preferably directly on the pivot axis).

The position of the pivot axis can be carefully surveyed. This becomes the known reference point for GPS reference station 14 on drone base station 10. The landing pad of the drone base station rotates with the rotating boom assembly, but its horizontal position does not change significantly. Thus, the operation of GPS reference station 14 is not impeded.

Figure 7:
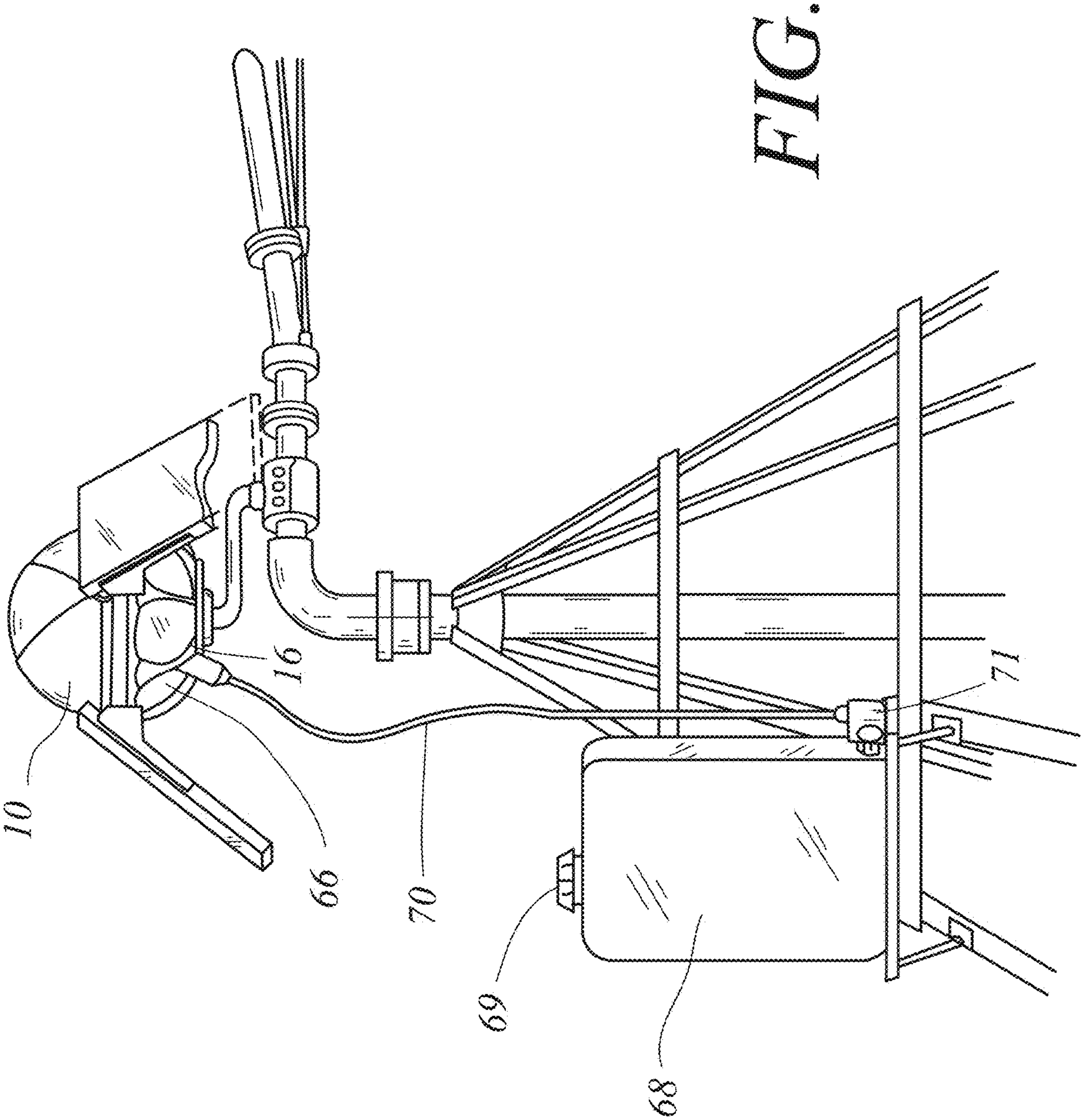
FIG. 7 is an elevation view, showing the system of FIG. 6 with the addition of a filler tank on the center-pivot and an additional tank on the base station.

Other features can be added to the inventive base station. As one example, it is desirable to provide a liquid storage and replenishment system for any liquid that is to be dispensed by the drone. The drone base station is high off the ground and refilling the drone while it sits on the pad is not convenient. FIG. 7 shows the system of FIG. 6 with the addition of filler tank 68 mounted on the center pivot structure. Opening 69 is provided in the filler tank. An operator can refill the filler tank from a passing vehicle using this opening. Pump 71 selectively transfers the liquid contained in filler tank 68 up through lift line 70 to toroidal tank 66 housed within chassis 16 of the drone base station (The toroidal tank in this instance is designed to occupy the space surrounding the electronics housing). A level sensor within the toroidal tank can be used to trigger the actuation of pump 71 as needed. A check valve prevents any flow from the toroidal tank back to filler tank 68.

Figure 8:
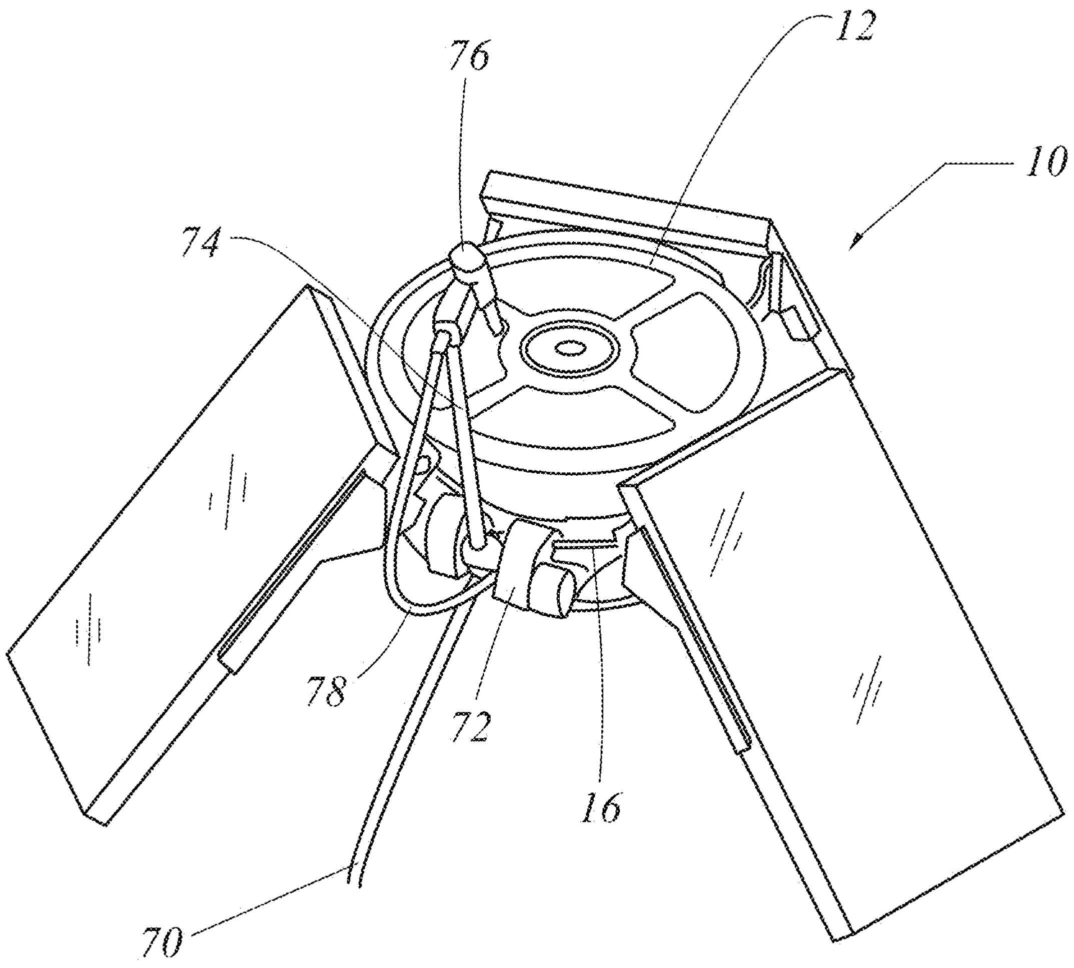
FIG. 8 is a perspective view, showing an exemplary liquid boom installed on the base station.

FIG. 8 shows an exemplary embodiment of a liquid replenishment system designed to transfer a liquid from toroidal tank into the tank on the drone itself. Liquid boom 74 is pivotally mounted to chassis 16 by mount 72. The boom is shown in the retracted position. It remains clear of the deployment arc of the retractable cover 28. In the position shown, the retractable cover can close without hitting any portion of the liquid boom.

Dispenser head 76 is provided on the distal end of the liquid boom. Feed line 78 connects the dispenser head to a liquid source (such as a small transfer pump feeding liquid from the toroidal tank to the feed line). In order to transfer liquid, the retractable cover is opened and the drone is placed in position where the drone's loading port is accessible. A drive motor then pivots liquid boom inward until dispenser head 76 lies over the drone's loading port. A transfer pump is then activated to pump liquid through dispenser head 76 and into the drone's tank.

Figure 9:
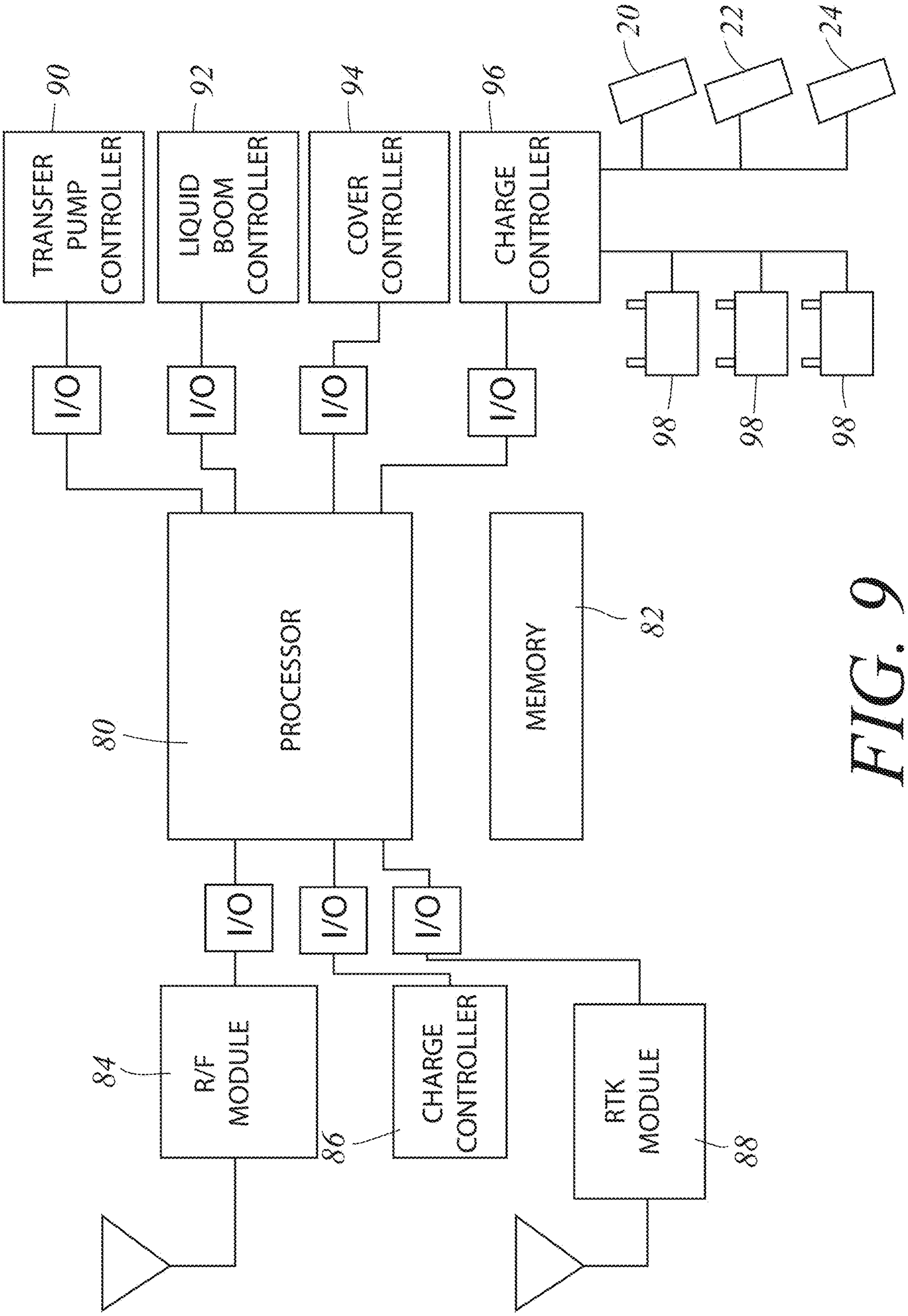
FIG. 9 is a schematic view, showing exemplary electronics mounted within the base station.

Returning to FIG. 5, the reader will again note the presence of electronics enclosure 26 (The toroidal tank is not shown in this view so that the electronics enclosure may be seen). The electronics enclosure preferably contains the power and control components needed to operate the drone base station, communicate with external devices, and communicate with the drone itself. The electronic and power components can assume a wide variety of forms. FIG. 9 shows one example. Processor 80 loads and runs software retrieved from associated memory 82. The processor interfaces with other components through numerous input/output ports. R/F module 84 allows the processor to wirelessly communicate with external devices. This allows an external device to send wireless signals commanding actions to be taken by the drone base station. These actions might include scheduling a drone survey. The R/F module can also be used to relay data that is collected by the drone and then stored on the drone base station.

Charge controller 86 controls the recharging of the drone through the landing pad. RTK module 88 is used to send GPS position correction signals from the drone base station (as determined using GPS reference station 14) to the drone, as well as any other nearby mobile GPS receivers needing correction.

Transfer pump controller 90 and liquid boom controller 92 control the liquid transfer operations from the filler tank and toroidal tank to the drone. Cover controller 94 controls the extension and retraction of the retractable cover. Solar charge controller 96 controls the charging of storage batteries 98 from solar panels 20,22, 24. The use of the solar panels with local batteries means that the drone base station and drone can be operated with no need for external power at all. It can simply be set up in a desired location and left to operate. Many other components and features can be added to the system depicted in FIG. 9 as well.

A brief description of possible operations the inventive drone base station can perform may aid the reader's understanding of additional inventive embodiments. FIG. 2 depicts the mobile drone 30 hovering over the landing pad on the inventive base station. The base station can serve as the primary point of communication for remote control. A central planning system residing on a remote computer can be used to communicate with multiple drone base stations. The central planning system sends a wireless or hard-wired signal to the drone base station providing a schedule of desired drone operations.

The drone base station communicates the desired operations to the drone (either wirelessly or through direct electrical contact using the drone's feet—where a data signal is superimposed on the power signal). The drone then flies the desired mission—surveying and collecting data and/or dispensing liquids. The drone returns to the landing pad 12 and downloads its data to the drone base station. The processor within the drone base station then processes the collected data and sends some or all of it (or possibly only a summary) to the remote computer.

Figure 11:
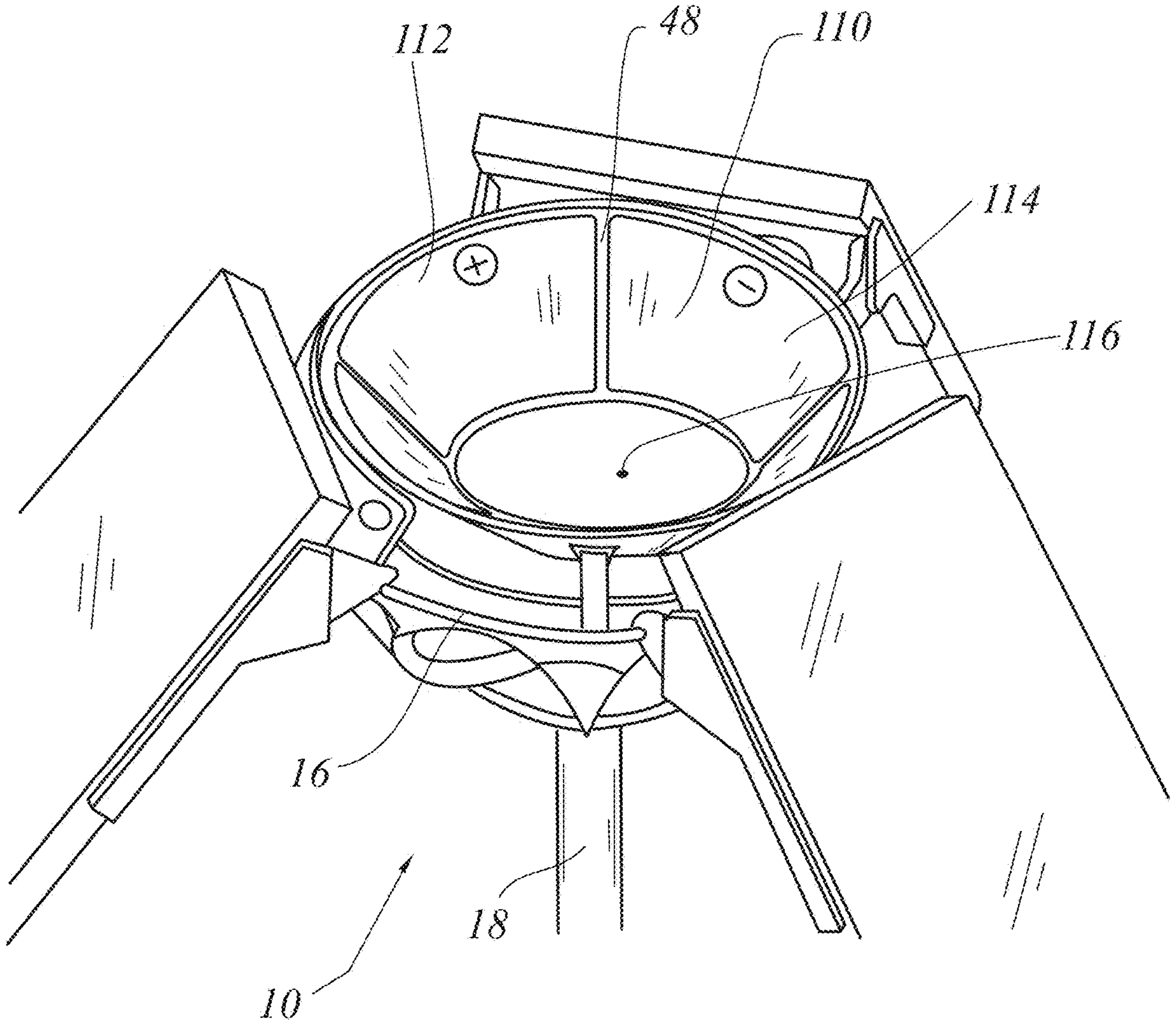
FIG. 11 is a perspective view, showing an alternate embodiment for the landing pad on the drone base station.

The landing pad and charging configuration for the base station can assume many different forms. FIGS. 11-14 illustrate a significant alternate embodiment. FIG. 11 shows an inventive drone base station 10 having a non-planar landing pad. Inverted conical landing pad 110 is an inverted conical surface that is open at the top. Lower opening 116 is preferably also provided. If direct contact charging is desired, then multiple charging contacts can be provided on the inward facing conical surface. As for the flat version, some of the charging contacts are electrically isolated in order to form a charging circuit. As an example, charge contact 112 can provide the positive leg of a DC charging circuit while charge contact 114 can provide the negative leg. Non-conductive areas 48 separate the charge contacts. Of course, AC charging may be used—in which case the charge contacts need to be isolated but do not necessarily need to be assigned a polarity.

Figure 12:
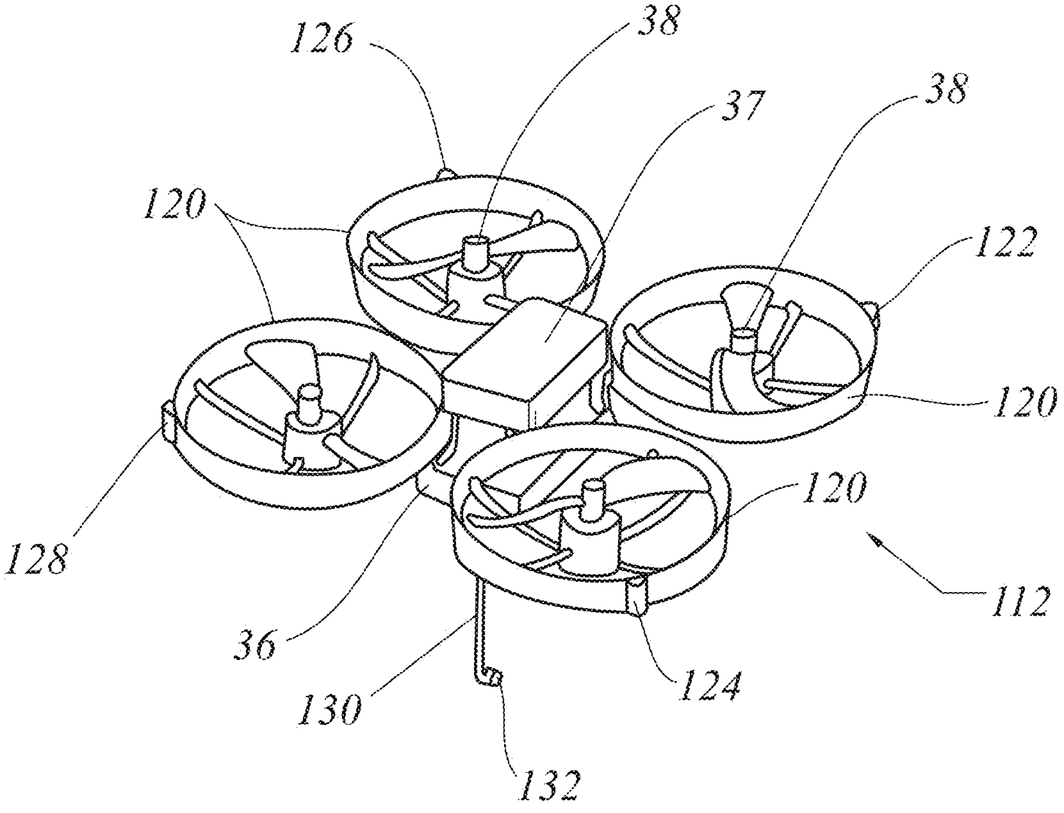
FIG. 12 is a perspective view, showing a drone having rotor guards and electrical contacts mounted on the rotor guards.

FIG. 12 shows an exemplar drone 118 configured for use with the inverted conical landing pad. Chassis 37 mounts the controlling electronics, batteries, and tank 36. Four rotors 38 are attached to the chassis, with each rotor being protected by a rotor guard 120. An electrical contact is provided on two or more rotor guards at a point that is distal from the chassis. In the example shown, four electrical contacts are provided on the rotor guards-electrical contact 122, electrical contact 124, electrical contact 126, and electrical contact 128. These contacts are connected to the charge controller within the drone.

Figure 13:
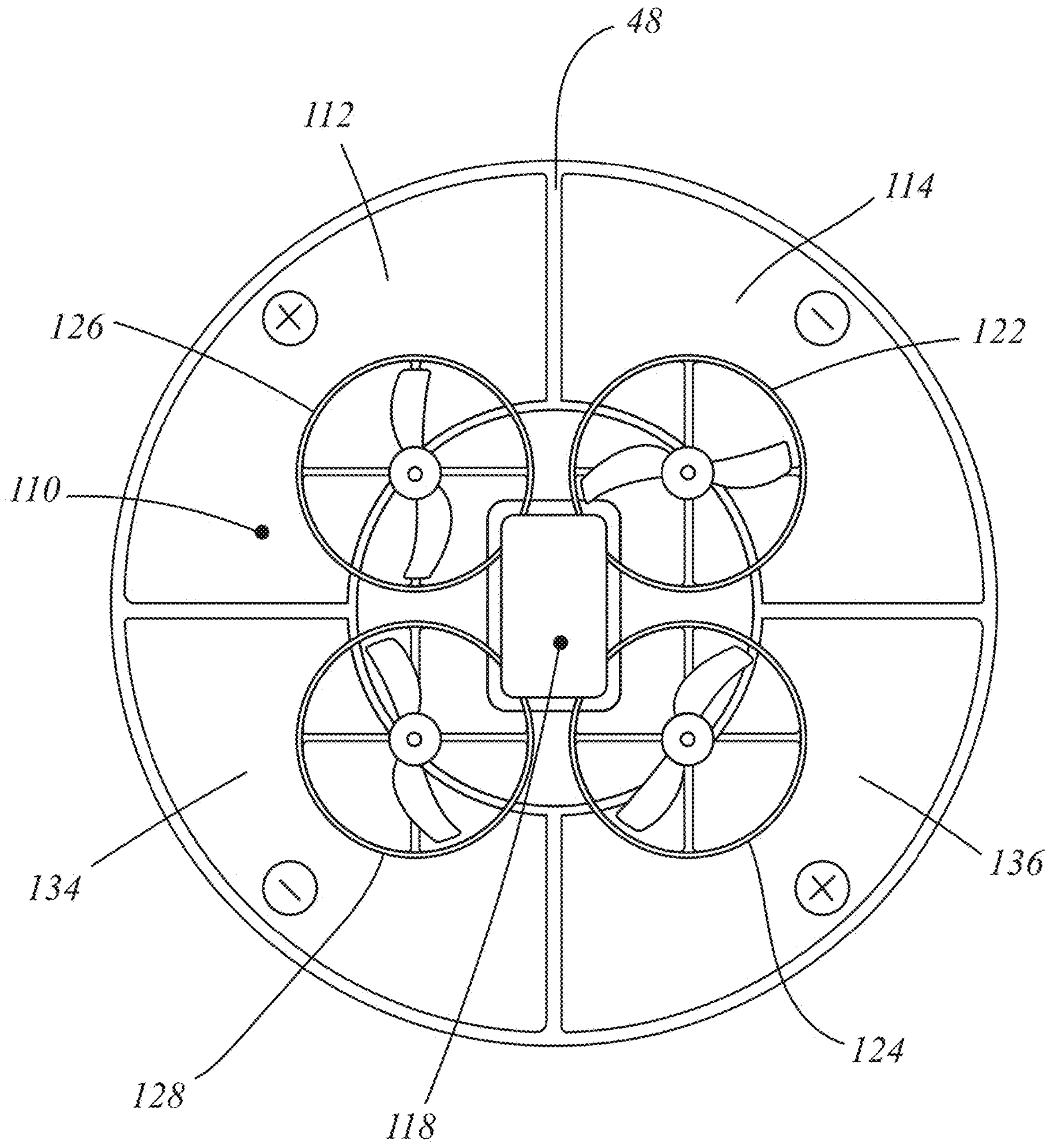
FIG. 13 is a plan view, showing the drone of FIG. 12 positioned on the landing pad of the embodiment of FIG. 11.

FIG. 13 shows a plan view of drone 118 after it has descended downward and come to rest on the inward facing surface of inverted conical landing pad 110. In the orientation shown, electrical contact 122 comes to rest against charge contact 114. Likewise, electrical contact 126 comes to rest against charge contact 112, electrical contact 128 comes to rest against charge contact 134, and electrical contact 124 comes to rest against charge contact 136. A suitable charging potential can be applied to the charge contacts and transferred to the charge controller on board the drone via the electrical contacts on the rotor guards.

The conical surface of the inverted conical landing pad tends to center the drone in the landing area and correct any small positional errors. In landing, the drone is maneuvered directly above the center of inverted conical landing pad 110. The drone is then slowly lowered until the rotor guards come in physical contact with the pad 110. The rotors are then switched off.

Figure 14:
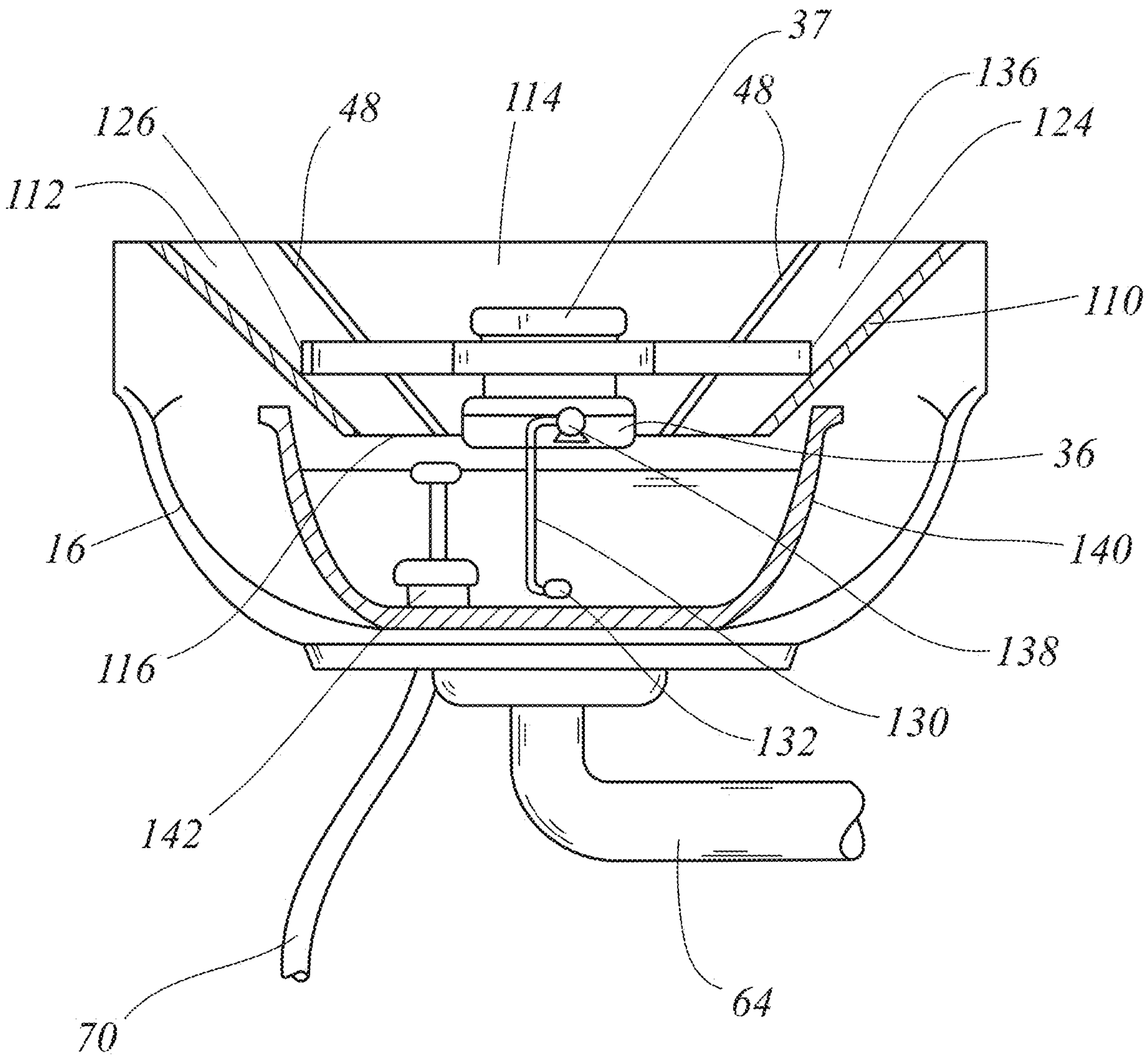
FIG. 14 is an elevation view with a cutaway, showing a drone charging on the alternate landing pad and replenishing its liquid supply.

FIG. 14 shows an elevation view of the same configuration—with the side of the landing pad 110 and tank 140 cut away so that the user can visualize the drone in its resting position. The reader will note how electrical contact 124 rests against charge contact 136 and electrical contact 126 rests against charge contact 112. These contacts allows the recharging of the drone.

This inventive embodiment also facilitates replenishing the liquid carried by the drone in its onboard tank 36. Tank 140 is provided beneath lower opening 116. Tank 140 is selectively fed liquid by lift line 70 (possibly using an external filler tank such as shown in FIG. 8). Valve 142 controls the flow into tank 140 in order to maintain a desired level. As one example, valve 142 may be a simple float valve.

When the drone parks as shown, intake 132 descends through lower opening 116 and comes to rest in the liquid within tank 140. Transfer pump 138 (contained within the drone) is activated to pull liquid from tank 140, through intake 132, up tube 130, and into tank 36 on board the drone.

Figure 16:
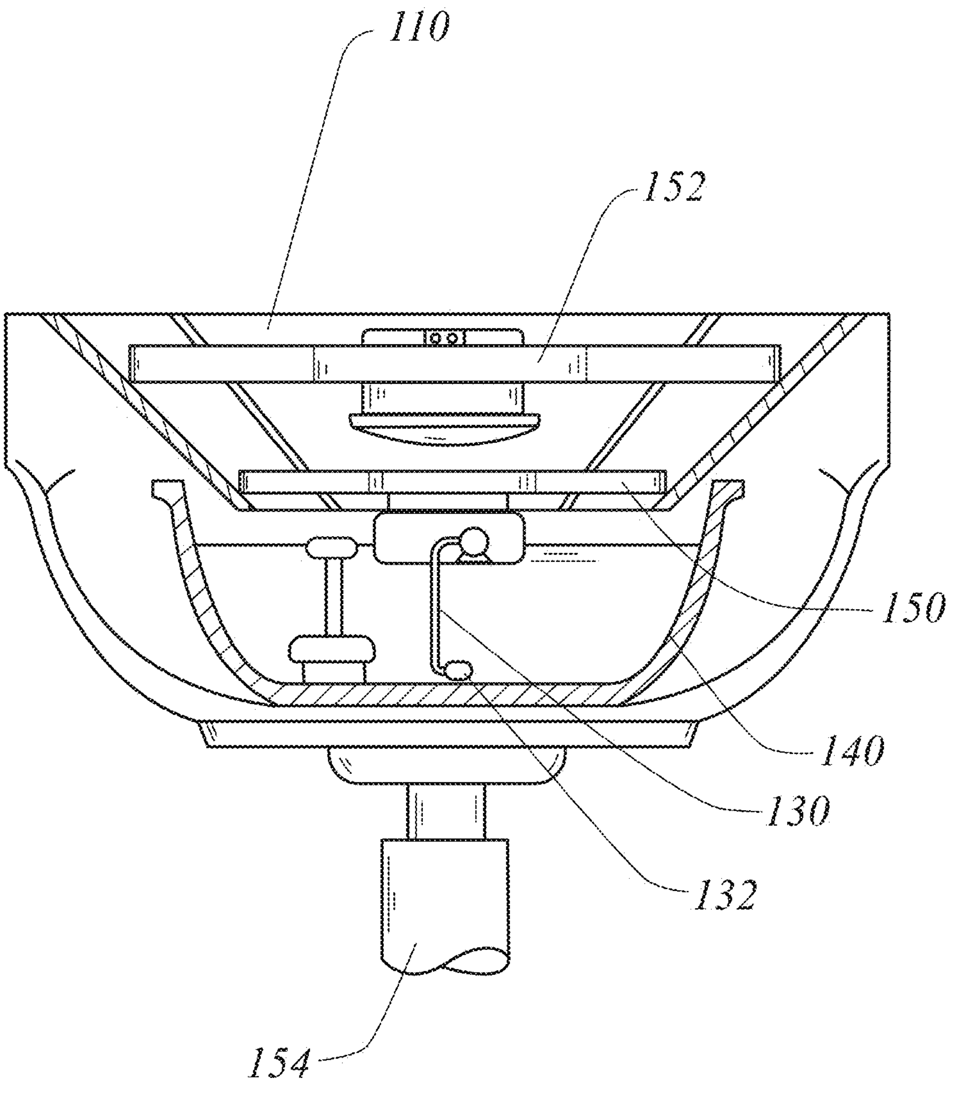
FIG. 16 is an elevation view with a cutaway, showing an alternate powers source for the drone base station.

The tapered nature of inverted conical landing pad 110 allows the drone base station to receive drones of varying sizes. It is even possible to "stack" a larger drone over a smaller drone on the same conical pad. FIG. 16 shows an example of this approach. Liquid spray drone 150 has a smaller rotor array so that it comes to rest further down within inverted conical landing pad 110. Tube 130 extends through the opening in the bottom of the landing pad and intake 132 rests within tank 140. A transfer pump on board drone 150 is activated to transfer liquid from tank 140 to the smaller tank on board the drone.

At the same time a larger data survey drone 152 is able to land on the same inverted conical landing pad 110. Drone 150 comes to rest at a higher position. The two drones can be simultaneously charged in this way. Communication is preferably maintained between the two drones or between the drones and processor 80. This communication is desirable so that the takeoff of the two drones can be properly sequenced. Drone 150 is held in position until drone 152 is well clear of the landing pad.

The embodiment of FIG. 16 also shows another approach to mounting the inventive drone base station. Pump house mount 154 attaches this particular base station to a pump house structure. The inventive drone base station can be attached to any convenient structure or separately mounted to the ground itself. The mounting location is by no means limited to a pivot or the vicinity of a pivot. Modern drones can travel considerable distances so the mount location does not need to be adjacent to the area where the drones will actually be used.

Figure 15:
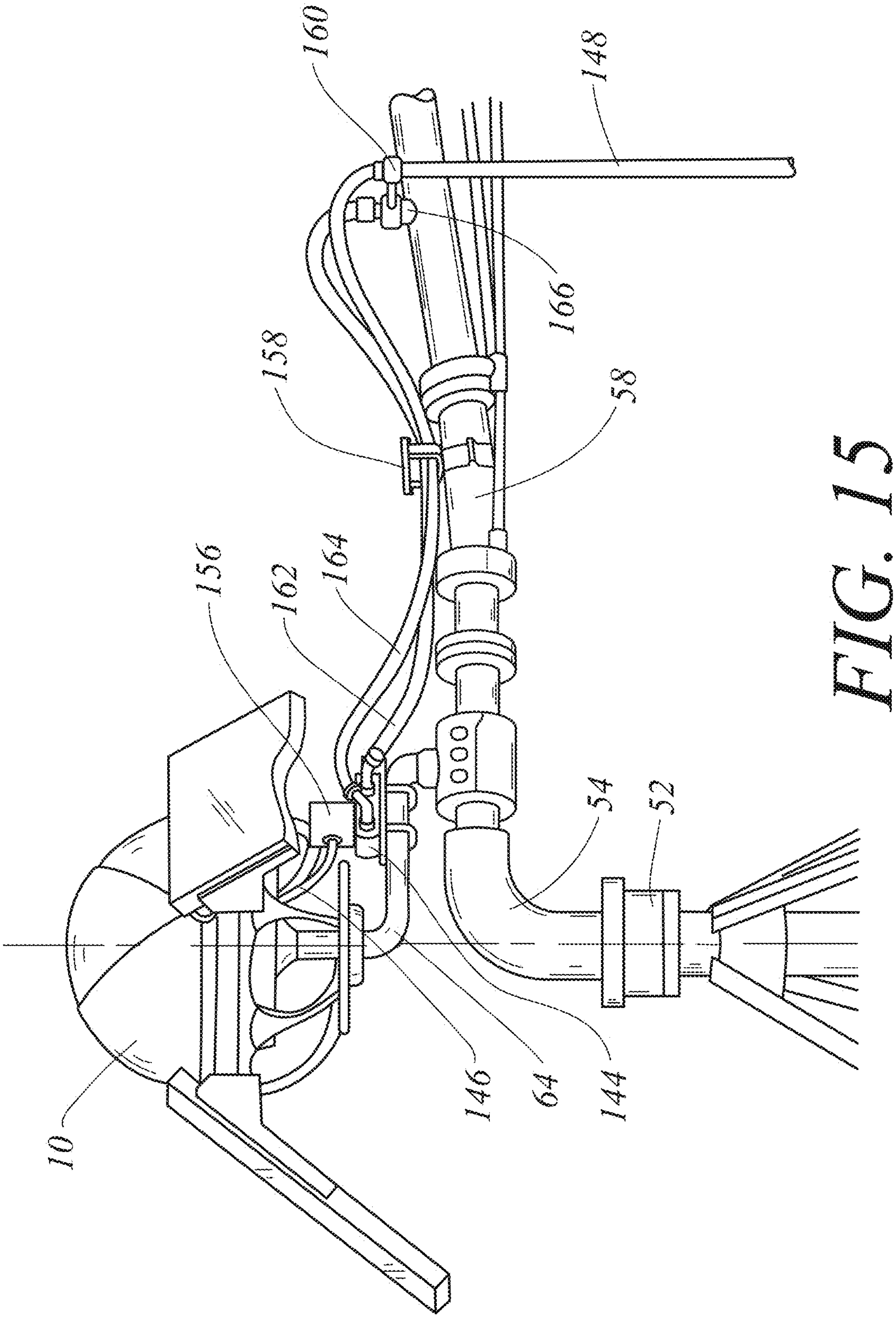
FIG. 15 is a perspective view, showing the use of a water turbine to provide additional electrical energy to the drone base station.

In the prior examples solar panels have been illustrated as the preferred power source, though of course other power sources can also be used. FIG. 15 shows a variation in which some electrical power is drawn from the water moving within a center pivot irrigation system. Outlet 166 is an outlet on boom 58 that customarily feeds liquid to one of the many pendants 148. In this variation the water flow is redirected through a turbine. Feed line 162 is connected between outlet 166 and water turbine 144. Discharge line 164 receives the water after it has passed through the water turbine and carries it back to pendant 148, where it is discharged through a spray head.

Water turbine 144 provides rotational power to generator 156. The electrical power produced by the generator is carried by charging line 146 to a charge controller contained within the drone base station. Bracket 158,160 route and constrain the lines.

Other embodiments of the invention will include other features. As an example, while it is preferable to mount the GPS reference receiver in the center of the landing pad, it is also possible to mount it in some other location on the drone base station. The preceding description contains significant detail regarding the novel aspects of the present invention. It should not be construed, however, as limiting the scope of the invention but rather as providing illustrations of the preferred embodiments of the invention. Thus, the scope of the invention should be fixed by the claims ultimately drafted, rather than by the examples given.

Having described my invention, I claim:

1. A drone system for receiving and charging an aerial drone having a mobile GPS receiver, comprising:
(a) a landing pad assuming the form of an inverted conical surface having an open bottom;
(b) a charging connection for recharging said drone in said landing pad;
(c) a storage tank located beneath said open bottom of said landing pad;
(d) said drone having a drone tank, an intake and a liquid conduit connecting said intake to said drone tank; and
(e) said drone resting on said inverted conical surface with said liquid conduit extending down through said open bottom of said landing pad and said intake resting within said storage tank so that a liquid contained within said storage tank can be transferred through said liquid conduit and into said drone tank.

2. The drone system as recited in claim 1, further comprising a retractable cover.

3. The drone system as recited in claim 2, wherein said retractable cover comprises multiple telescoping pieces.

4. The drone system as recited in claim 1, further comprising:
(a) a GPS reference receiver located in said landing pad; and
(b) a wireless communication link between said GPS reference receiver and said aerial drone, said wireless communication link providing position correction signals to said aerial drone.

5. The drone system as recited in claim 1, wherein said charging connection comprises:
(a) a first charge contact on said landing pad; and
(b) a second charge contact on said landing pad that is electrically isolated from said first charge contact.

6. The drone system as recited in claim 5, wherein:
(a) said drone has a first electrical contact;
(b) said drone has a second electrical contact; and
(c) said first and second charge contacts on said base station are positioned so that said first charge contact touches said first electrical contact on said drone and said second charge contact touches said second electrical contact on said drone while said drone is resting on said landing pad.

7. The drone system as recited in claim 1, further comprising:
(a) a center-pivot irrigation system;

(b) said center-pivot irrigation system having a pivot axis; and (c) said landing pad being mounted proximate said pivot axis.

8. The drone system as recited in claim 1, further comprising:

(a) a filler tank; and (b) a lift line connecting said filler tank to said storage tank.

9. The drone system as recited in claim 1, further comprising:

(a) said drone resting in a lower position on said inverted conical surface; and (b) a second drone resting in an upper position on said inverted conical surface, said upper position being above said lower position.

10. The drone system as recited in claim 9, wherein:

(a) said drone is a dispensing drone; and (b) said second drone is a data survey drone.

11. A drone system for receiving and charging an aerial drone having a mobile GPS receiver, comprising:

(a) a landing pad assuming the form of an inverted conical surface having an open bottom;

(b) a charging connection for recharging said drone in said landing pad;

(c) a GPS reference receiver located proximate said landing pad;

(d) a processor with an associated memory, said processor controlling operations of said base station; and (e) said GPS reference receiver providing position correction signals to said aerial drone using a wireless communication link between said base station and said drone.

12. The drone system as recited in claim 11, further comprising a retractable cover controlled by said processor.

13. The drone system as recited in claim 12, wherein said retractable cover comprises multiple telescoping pieces.

14. The drone system as recited in claim 11, further comprising:

(a) a storage tank located beneath said open bottom of said landing pad;

(b) said drone having a drone tank, an intake and a liquid conduit connecting said intake to said drone tank; and (c) said drone resting on said inverted conical surface with said liquid conduit extending down through said open bottom of said landing pad and said intake resting within said storage tank so that a liquid contained within said storage tank can be transferred through said liquid conduit and into said drone tank.

15. The drone system as recited in claim 11, wherein said charging connection comprises:

(a) a first charge contact on said landing pad; and (b) a second charge contact on said landing pad that is electrically isolated from said first charge contact.

16. The drone system as recited in claim 15, wherein:

(a) said drone has a first electrical contact;

(b) said drone has a second electrical contact; and (c) said first and second charge contacts on said base station are positioned so that said first charge contact touches said first electrical contact on said drone and said second charge contact touches said second electrical contact on said drone while said drone is resting on said landing pad.

17. The drone system as recited in claim 11, further comprising:

(a) a center-pivot irrigation system;

(b) said center-pivot irrigation system having a pivot axis; and (c) said landing pad being mounted proximate said pivot axis.

18. The drone system as recited in claim 11, further comprising:

(a) a filler tank; and (b) a lift line connecting said filler tank to said storage tank.

19. The drone system as recited in claim 18, further comprising:

(a) said drone resting in a lower position on said inverted conical surface; and (b) a second drone resting in an upper position on said inverted conical surface, said upper position being above said lower position.

20. The drone system as recited in claim 19, wherein:

(a) said drone is a dispensing zone with a drone; and (b) said second drone is a data survey drone.

* * * * *